US010601753B2

(12) United States Patent
Draeger et al.

(10) Patent No.: US 10,601,753 B2
(45) Date of Patent: Mar. 24, 2020

(54) AUTOMATIC THREADING OF CONVERSATIONS BASED ON CONTENT AND INTERACTIONS

(71) Applicant: International Business Machines Corporation, Armonk, NY (US)

(72) Inventors: David R. Draeger, Rochester, MN (US); Craig R. Wolpert, Holliston, MA (US)

(73) Assignee: International Business Machines Corporation, Armonk, NY (US)

( * ) Notice: Subject to any disclaimer, the term of this patent is extended or adjusted under 35 U.S.C. 154(b) by 221 days.

(21) Appl. No.: 15/479,109

(22) Filed: Apr. 4, 2017

(65) Prior Publication Data

US 2018/0287982 A1 Oct. 4, 2018

(51) Int. Cl.
*G06F 15/16* (2006.01)
*H04L 12/58* (2006.01)

(52) U.S. Cl.
CPC .............. *H04L 51/16* (2013.01); *H04L 51/04* (2013.01); *H04L 51/12* (2013.01)

(58) Field of Classification Search
None
See application file for complete search history.

(56) References Cited

U.S. PATENT DOCUMENTS

| 7,200,635 | B2 | 4/2007 | Yashchin et al. | |
| 8,909,569 | B2 | 12/2014 | Spivack et al. | |
| 2007/0255791 | A1* | 11/2007 | Bodlaender | H04L 12/1822 709/206 |
| 2010/0017483 | A1 | 1/2010 | Estrada | |
| 2011/0105160 | A1* | 5/2011 | Tysowski | H04L 51/04 455/466 |
| 2013/0007137 | A1* | 1/2013 | Azzam | H04L 51/16 709/206 |
| 2013/0018909 | A1* | 1/2013 | Dicker | G06Q 10/10 707/758 |
| 2015/0033155 | A1* | 1/2015 | Camacho | H04L 51/32 715/758 |
| 2016/0065519 | A1* | 3/2016 | Waltermann | H04L 51/16 709/206 |
| 2016/0065520 | A1* | 3/2016 | Puranik | H04L 51/16 715/752 |
| 2016/0241494 | A1* | 8/2016 | Badge | H04L 51/046 |

* cited by examiner

*Primary Examiner* — Mohamed Ibrahim
(74) *Attorney, Agent, or Firm* — Patterson + Sheridan, LLP

(57) ABSTRACT

Systems, methods, and computer program products to perform an operation comprising identifying, in a first thread comprising a plurality of messages outputted for display on a display device, a first concept in a text of a first message of the plurality of messages, identifying a second concept in a text of a second message of the plurality of messages of the first thread, upon determining that the second concept is different than the first concept, generating a second thread comprising a subset of the plurality of messages, wherein each message in the subset of the plurality of message is related to the second concept, and outputting, based on a set of user preferences, the subset of the plurality of messages of the second thread for display on the display device.

17 Claims, 10 Drawing Sheets

Threads
- Work
- Chess club
- Family
- Cars
- *Vacation*
- Wife
- Son

201

Me:      So where are we going on vacation this summer?
Mom:     Let's go to Hawaii!
Sister:  I'd like to go to Las Vegas
Me:      Vegas sounds great!
Dad:     New York gets my vote.
Me:      How would we travel to these places?
Cousin1: New York would be awesome
Granny:  I'd like to go to any of those places.
Granny   Maybe we should fly.
Grandpa: I'm not driving with Granny
Cousin2: California is great in the summer.
...
Me:      Ok, New York id the destination!

[Type message here, press enter to submit.....]
202
203

Threads
- Work
- Chess club
- Family
- Cars
- *Vacation*
- Travel
- Wife
- Son

Me: So where are we going on vacation this summer?
Mom: Let's go to Hawaii
Sister: I'd like to go to Las Vegas
Me: Vegas sounds great!
Dad: New York gets my vote.
Me: How would we travel to these places?
Cousin1: New York would be awesome
Granny: I'd like to go to any of those places.
Granny Maybe we should fly.
Grandpa: I'm not driving with Granny
Cousin2: California is great in the summer.
....
Me: Ok, New York is the destination!

Me: *How would we travel to these places?*
Granny: *Maybe we should fly.*
Grandpa: *I'm not driving with Granny.*
Mom: *If we're going to Hawaii, we have no choice but to fly!*
Sister: *Let's take the train to Vegas.*
Cousin: *Let's fly to New York.*
....
Me: *Ok, it's settled, granny, cousin, and Grandpa are flying, the rest of us are driving.*

Threads
- Work
- Chess club
- Family
- Cars
- *Vacation*
- *Travel (Closed)*
- Wife
- Son

201

Me: So where are we going on vacation this summer?
Mom: Lets go to Hawaii!
Sister: I'd like to go to Las Vegas
Me: Vegas sounds great!
Dad: New York gets my vote.
Me: How would we travel to these places? *(Granny, cousin, and Grandpa are flying, the rest of us are driving)*
Cousin1: New York would be awesome
Granny: I'd like to go to any of those places.
Granny Maybe we should fly.
Grandpa: I'm not driving with Granny
Cousin2: California is great in the summer.
...
Me: Ok, New York is the destination!

Threads
- Work
- Chess club
- Family
- Cars
- *Vacation*
- Wife
- Son

Me: So where are we going on vacation this summer?
Mon: Let's go to Hawaii
Sister: I'd like to go to Las Vegas
Me: Vegas sounds great!
Dad: New York gets my vote.
Me: How would we travel to these places?
Cousin1: New York would be awesome
Granny: I'd like to go to any of those places.
Granny: Maybe we should fly.
Grandpa: I'm not driving with Granny
Cousin2: California is great in the summer.
*Evil Twin: Anywhere is good for me, I'd love be with the family, especially to see my twin!*
...
Me: Ok, New York is the destination!

You have muted messages from Evil Twin. However, this user's approval rating exceeds a threshold. Would you like to unmute this user?

Yes 212 | No 213

AUTOMATIC THREADING OF CONVERSATIONS BASED ON CONTENT AND INTERACTIONS

BACKGROUND

The present disclosure relates to computer software, and more specifically, to computer software which provides automatic threading of conversations based on content and interactions.

Many collaborative systems (e.g., email, forums, meeting chats, group chats, etc.) bring multiple contributors together for text-based discussion. Often, a discussion thread for a single topic morphs into multiple discussions for different topics in the discussion thread for the single topic. As such, it becomes difficult for users to follow each topic in a single thread. In many cases, users are unaware of the different topics being discussed, often missing out on important discussions.

SUMMARY

In one embodiment, a method comprises identifying, in a first thread comprising a plurality of messages outputted for display on a display device, a first concept in a text of a first message of the plurality of messages, identifying a second concept in a text of a second message of the plurality of messages of the first thread, upon determining that the second concept is different than the first concept, generating a second thread comprising a subset of the plurality of messages, wherein each message in the subset of the plurality of message is related to the second concept, and outputting, based on a set of user preferences, the subset of the plurality of messages of the second thread for display on the display device.

In another embodiment, a system comprises a processor and a memory storing instructions, which when executed by the processor, performs an operation comprising identifying, in a first thread comprising a plurality of messages outputted for display on a display device, a first concept in a text of a first message of the plurality of messages, identifying a second concept in a text of a second message of the plurality of messages of the first thread, upon determining that the second concept is different than the first concept, generating a second thread comprising a subset of the plurality of messages, wherein each message in the subset of the plurality of message is related to the second concept, and outputting, based on a set of user preferences, the subset of the plurality of messages of the second thread for display on the display device.

In another embodiment, a computer-readable storage medium has computer-readable program code embodied therewith, the computer-readable program code executable by a processor to perform an operation comprising identifying, in a first thread comprising a plurality of messages outputted for display on a display device, a first concept in a text of a first message of the plurality of messages, identifying a second concept in a text of a second message of the plurality of messages of the first thread, upon determining that the second concept is different than the first concept, generating a second thread comprising a subset of the plurality of messages, wherein each message in the subset of the plurality of message is related to the second concept, and outputting, based on a set of user preferences, the subset of the plurality of messages of the second thread for display on the display device.

BRIEF DESCRIPTION OF THE SEVERAL VIEWS OF THE DRAWINGS

FIG. 2A-2D illustrate examples of automatically threading conversations based on content and interaction, according to various embodiments.

DETAILED DESCRIPTION

Embodiments disclosed herein automatically thread conversations based on one or more of the content of the conversations, user preferences, and user interactions. For example, user A may create a discussion thread in an online gaming forum to discuss video game X. During the discussion, user B may post a question about video game Y. In response to user B's question, other users begin to provide answers and generally discuss video game Y in the discussion thread for video game X. Advantageously, embodiments disclosed herein identify that the users are discussing video game Y in the thread for video game X, and create a new thread for video game Y. In at least one embodiment, the new thread for video game Y is automatically presented to the users viewing the thread for video game X.

Figure 1:
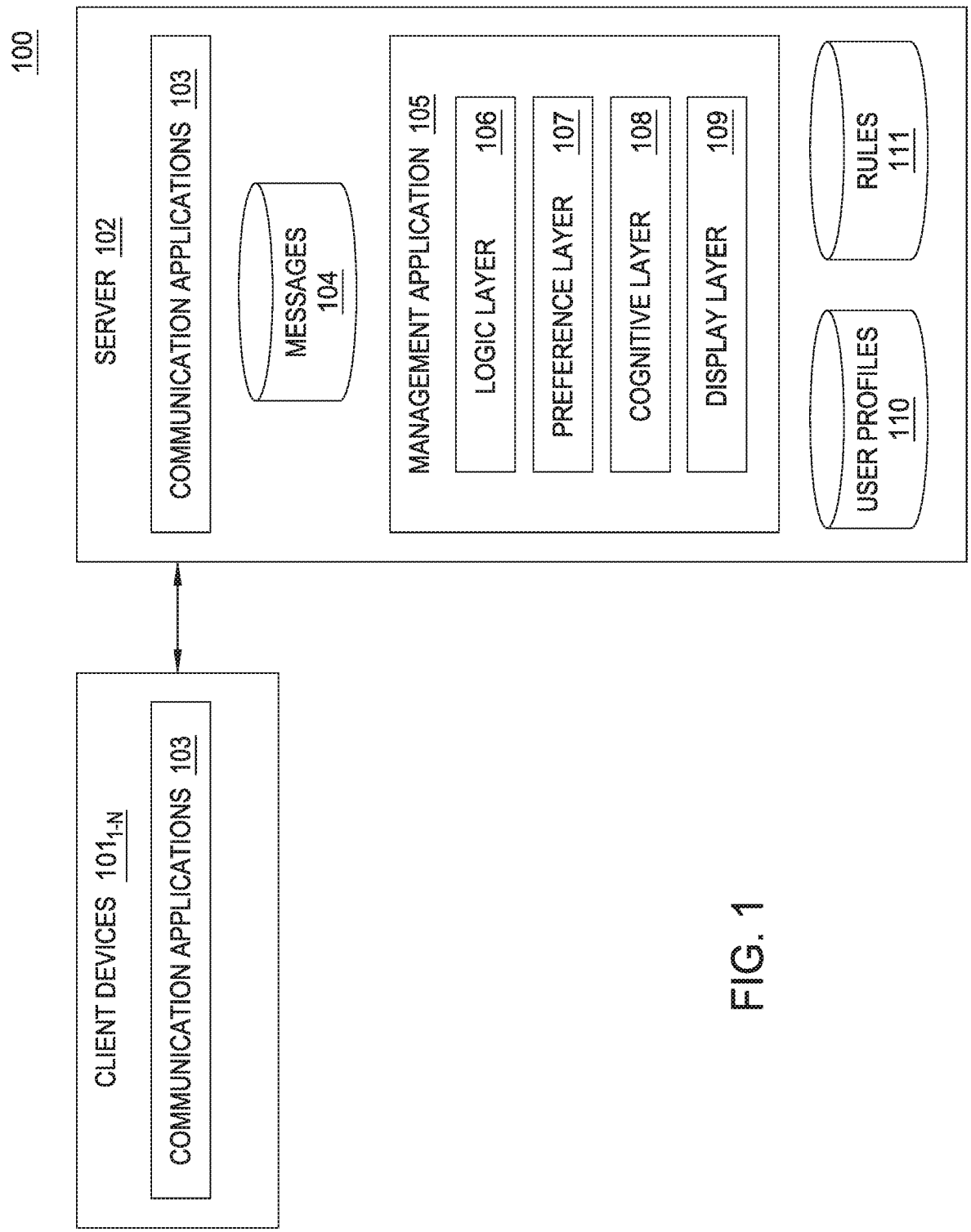
FIG. 1 illustrates an example system architecture which automatically threads conversations based on content and interactions, according to one embodiment.

FIG. 1 illustrates an example system architecture 100 which automatically threads conversation based on content and interactions, according to one embodiment. As shown, the system includes a plurality of client devices $101_{1-N}$ and a server 102. As shown, the client devices $101_{1-N}$ include a plurality of communication applications 103. The communication applications 103 are representative of any type of application which allows users communicate via text that is organized into threads (or groups, windows, etc.), such as email clients, chat rooms, forums, meeting rooms, and the like. Furthermore, the communication applications 103 include web browsers which expose similar functionality (e.g., web-based email clients, chat rooms, forums, etc.). In addition to text, the users of the communication applications 103 may further communicate via voice messages, images, videos, and any other type of objects.

As shown, the server 102 includes a management application 105 and instances of the communication applications 103. The management application 105 is generally configured to automatically generate new thread conversations based on one or more of content of the conversations, user preferences, and user interactions. As shown, the management application 105 includes a logic layer 106, a preference layer 107, a cognitive logic 108, and a display layer 109. The logic layer 106 leverages cognitive computing to determine when a new topic of discussion is started within an existing thread in the messages 104 (e.g., identifying phrases such as "what about . . . "). In addition, the logic layer 106 may determine when the focus of users viewing the thread shift to the new topic of discussion. Furthermore, the logic layer 106 leverages cognitive computing to determine when a given thread concludes (e.g., when a user sends a message 104 including "in summary", or "the conclusion is"). Further still, the logic layer 106, over time, learns phrases that users typically use to conclude a conversation, and uses these learned phrases to determine to close a thread with a high level of confidence.

Generally, the logic layer 106 continuously monitors the messages 104, tracking changes and references to other topics or users in a given thread. For example, if the logic layer 106 identifies the term "#basketball" in a forum thread discussing football, the logic layer 106 determines that the users have begun discussing a new topic. Similarly, if the logic layer 106 identifies a user identifier of "@celebrityx" in a forum where users have been discussing a different celebrity, the logic layer 106 determines that the users have begun discussing a new topic. In at least one embodiment, the logic layer 106 applies a threshold before determining whether the new topic has begun. For example, the threshold may relate to a number of messages 104 in the thread that include the new topic. If the number of messages 104 that include the topic exceed the threshold, the logic layer 106 determines that the new topic of discussion has begun, and that a new thread should be created for the new topic. In at least one embodiment, the logic layer 106 assigns a new universally unique identifier (UUID) to any newly discovered topic within a group of messages associated by an existing UUID. The display layer 109 allows users to track, follow, and participate in the threads discovered by the logic layer 106. For example, if the logic layer 106 identifies a new topic of discussion in an email thread, the display layer 109 may automatically output the new topic of discussion in a separate thread, window, or panel.

The preference layer 107 allows users to customize the logic layer 106. For example, each user may set a respective required number of references to a given topic before the logic layer 106 determines that a new topic of discussion has begun in a thread, and that a new thread should be created for the new topic. As another example, a user of the preference layer 107 defines preferred fonts, styles, and the like for viewing the messages 104, which are then stored in the user profiles 110. The cognitive logic 108 alerts a user to a thread or other content to which user preferences in the user profiles 110 have been applied. For example, assume user A has defined user X as a "blocked user" in the user profiles 110, such that user X's messages in the messages 104 are not outputted for display on client devices $101_{1-N}$ used by user X. Furthermore, assume the cognitive logic 108, in analyzing the substance of user X's messages in the messages 104 and feedback and/or replies to user X's messages in the messages 104, determines that user X is highly respected by other users. As such, the cognitive logic 108 prompts user A to consider unblocking user X. If user A approves, user A would then begin to view user X's messages in the messages 104 when using the communication applications 103.

As shown, the server 102 further includes data stores for messages 104, user profiles 110, and rules 111. The messages 104 store the text, images, and any other objects contributed by the users of the communication applications 103. Although depicted as a common data store, in some embodiments, each respective communication application 103 has its own instance of the messages 104. Generally, for a given communication application 103 the messages that make up a single thread of discussion share a relationship based on a common identifier (e.g., a universally unique identifier (UUID)). For example, an email chain sent between multiple users share the same UUID, allowing an email client instance of a communication application 103 to display the email chain as a single thread.

The user profiles 110 include user profiles for a plurality of users of each communication application 103. A given user profile 110 generally includes metadata describing the user and user preferences. The user profiles 110 may further include style preferences (e.g. fonts, font sizes, font effects), new thread preferences (e.g., open the new thread in a new tab, window, panel, etc.), and the like. Furthermore, each user may provide feedback regarding other users. For example, a user may vote "thumbs up" or "thumbs down" for another user, or each of the messages 104 associated with the user. These votes may then be associated with the respective user in the corresponding user profile 110. Furthermore, each user profile 110 may include social connections between users. Therefore, for example, if user X ranks user A as an expert contributor, and user A has ranked user B as an expert contributor, then user B would be defined as an expert contributor for user X by association. The rules 111 are representative of rules leveraged by the management application 105. For example, the rules may include default formatting rules, words and/or phrases identified by the logic layer 106 as marking the start of a new topic of conversation, marking the start of an end of a conversation, and the like.

FIG. 2A illustrates an example graphical user interface (GUI) 200 which reflects automatically threaded conversations based on content and interaction, according to one embodiment. As shown, the GUI 200 includes a threads panel 201 and a messages panel 202. The threads panel 201 lists a plurality of different threads of discussion (e.g., work, family, cars), each of which are associated with one or more messages in the messages 104. The messages panel 202 outputs the messages from the messages 104 that are associated with a given thread in the threads 201. As shown, a user has selected the "Vacation" thread from the threads panel 201. As such, the messages panel 202 depicts a plurality of messages from the messages 204 submitted by a plurality of different users via a submission box 203 of the GUI 200. As shown, the users in the vacation thread are discussing where to take their next family vacation. The logic layer 106 determines that the thread is related to the family vacation based on an analysis of the messages 104 and/or the title of the selected thread in the threads panel 201. Furthermore, the logic layer 106 analyzes the messages to determine that a separate topic of discussion has emerged within the vacation thread. Specifically, the logic layer 106 has determined that the users are discussing not only where they would like to visit for their vacation, but also how they would travel to their selected destination.

Generally, the logic layer 106 may use any suitable technique to identify the new topic of discussion (means of travel). For example, the logic layer 106 may use natural language classifiers to identify the concepts, topics, and/or intent in the messages 104. Similarly, the logic layer 106 may identify keywords and/or punctuation that indicate new topics of discussion. Once the logic layer 106 identifies the new topic of discussion, the logic layer 106 invokes the display layer 109 to output the new topic in a new thread.

FIG. 2B depicts the GUI 200 after the display layer 109 has generated a panel 210 for the travel topic identified in the vacation thread. As shown, the panel 210 includes messages 104 from the vacation thread that are related to the topic of travel. Furthermore, as shown, the threads panel 201 now includes an entry for a travel thread, generated by the logic layer 106. As previously indicated, in at least one embodiment, the logic layer 106 generates a new UUID for the travel thread, and associates each message in the messages 104 that are related to the travel discussion with this new UUID. As shown, the messages in the travel panel 210 are italicized. The display layer 109 may generally reference the user profiles 110 to determine preferred font colors, font attributes, font sizes, or hierarchies for rendering the panel 210 and associated content. As such, in the example depicted in FIG. 2B, the text in the panel 210 is italicized based on the preferences in the user profile 110 of the viewing user. Furthermore, as each user has their own user profile 110, the display layer 109 may output the travel panel 210 according to different style preferences.

As previously indicated, the logic layer 106 is configured to determine when a topic of discussion ends. FIG. 2C depicts such an embodiment where the logic layer 106 has automatically closed the travel thread based on the messages posted by the users in the GUI 200. For example, based on the statement "Ok, it's settled, Granny, cousin, and Grandpa are flying, the rest of us are driving" in the travel panel 210 of FIG. 2B, the logic layer 106 determines that the "travel" discussion has concluded. In at least one embodiment, the logic layer 106 identifies the phrase "ok, it's settled" as a learned phrase used by the user "me" when closing threads over time.

When closing a thread, the logic layer 106 may apply user preferences for modifying the GUI 200. For example, as shown, the thread panel 201 now indicates that the travel thread has been closed. Furthermore, as shown, the messages panel 202 outputs the messages from the vacation thread. In addition, the messages panel 202 includes a summary 220 of the travel thread. The summary may be programmatically generated by the logic layer 106. In other embodiments, once the logic layer 106 determines that a topic of discussion has concluded, the logic layer 106 may ask the user to summarize the topic of discussion. If the user agrees and provides a summary, the logic layer 106 may store the summary in the messages 104, and associate the summary with the UUID of the messages in the associated thread. As such, the logic layer 106 is able to output the user-generated summary 220 in the messages panel 202.

FIG. 2D depicts an embodiment where the cognitive logic 108 provides a suggestion to a user, according to one embodiment. As previously indicated, users may block other users in their user profiles 110. Similarly, the users may define other users as favorites, friends, or any other type of association. In the embodiment depicted in FIG. 2D, the user has stored an indication to mute the user "EvilTwin." However, the cognitive logic 108 may analyze the feedback describing user EvilTwin provided by other users. If the cognitive logic 108 determines that user EvilTwin has an approval rating which exceeds a threshold (e.g., based on a likability score, a number of likes, a number of thumbs up votes, etc.), the cognitive logic 108 may invoke the display layer 109. In response, the display layer 109 generates the GUI panel 214 asking whether the user would like to unmute EvilTwin based on the approval rating exceeding a threshold. If the user accepts the suggestion, then messages from EvilTwin appear in the message panel 202. Therefore, as shown, assuming the user clicks the yes button 212, and not the no button 213, a message from EvilTwin is displayed in the messages panel 202 (which was not displayed in FIGS. 2A-2C).

Figure 3:
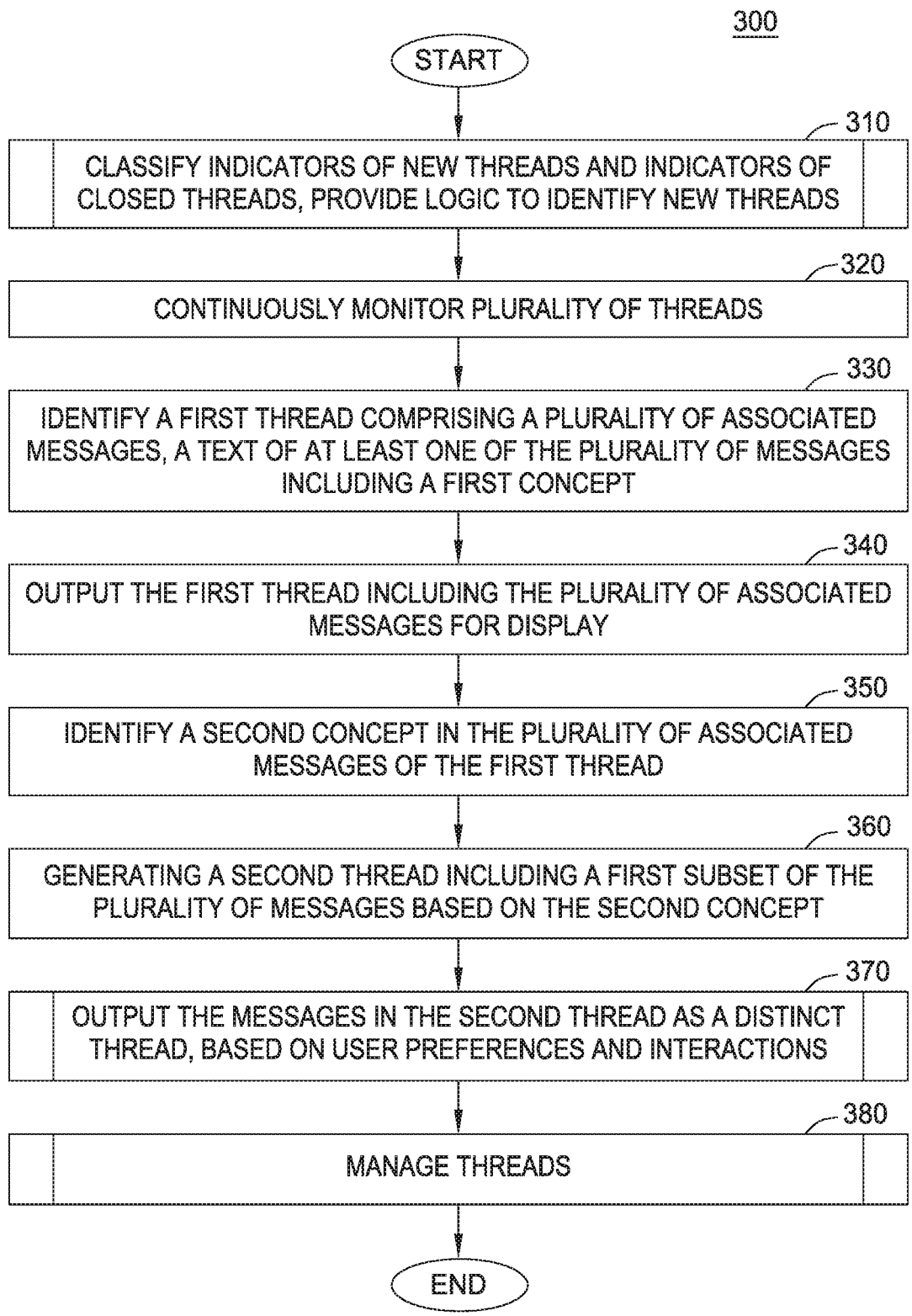
FIG. 3 is a flow chart illustrating an example method to automatically thread conversations based on content and interactions, according to one embodiment.

FIG. 3 is a flow chart illustrating an example method 300 to automatically thread conversation based on content and interactions, according to one embodiment. As shown, the method 300 begins at block 310, where the logic layer 106 identifies indicators of new threads and indicators of closed threads. Generally, the rules 111 include words, concepts, formatting, and/or phrases that indicate whether a new thread (or topic) has started or has been closed. The rules 111 include predefined indicators as well as indicators that the logic layer cognitively learns over time. For example, predefined phrases that indicate a new topic has begun include "I was wondering," "how about," and the like. Similarly, predefined phrases that indicate a thread should be closed include "goodbye," "thank you," and the like. However, the logic layer 106 builds on the predefined indicators in the rules 111 and cognitively learns additional indicators at block 310. For example, a first user may consistently use the phrase "cheers" to conclude a topic of conversation. The logic layer 106, based on the context and consistent use of "cheers" by the first user, may then define the phrase "cheers" as a cognitively learned closing phrase for the first user in the rules 111. Furthermore, at block 310, the logic layer 106 is trained to identify new topics/concepts in existing threads.

At block 320, the logic layer 106 continuously monitors each of the threads in the messages 104. Generally, at block 320, the logic layer 106 searches for concepts, phrases, and the like which indicate a new topic of discussion has begun in a given thread, and a new thread should be created for the new topic. If the logic layer 106 identifies a different topic in the thread, the logic layer 106 determines that a new topic has emerged. At block 330, the logic layer 106 identifies a first thread. The first thread comprises a plurality of messages in the messages 104 that are associated by a common UUID. The logic layer 106 may identify a first concept based on an analysis of the text of the messages 104. As previously indicated, the logic layer 106 may use natural language classifiers to identify the topic of a given thread. At block 350, the logic layer 106 identifies a second concept (conceptually distinct from the first concept) in the plurality of messages of the first thread. For example, the natural language classifier may return an indication that the first concept is not related to the second concept. As another example, the natural language classifier may return an indication that the first concept is distinct from the second concept. As such, the logic layer 106 determines that the second concept was not previously present in the messages of the first thread, and is therefore a new concept in the first thread.

At block 360, the logic layer 106 generates a second thread for messages 104 including the second concept from the first thread. In at least one embodiment, the logic layer 106 assigns a new UUID to the messages including the second concept, where the new UUID is different than the UUID applied to the messages of the first thread. At block 370, described in greater detail with reference to FIG. 5, the display layer 109 outputs the messages of the second thread as a thread distinct from the first thread based on the user preferences and/or interactions. Generally, the display layer 109 applies the rules 111 and preferences in each user profile 110 when rendering and outputting the second thread to each user. At block 380, described in greater detail with reference to FIG. 6, the logic layer 106 manages the first and second threads, where managing the threads may include closing one of the first and second threads. The logic layer 106 generally closes threads based on the predefined indicators in the rules 111 and/or the indicators identified by the logic layer 106 using cognitive logic at block 310. Additionally and/or alternatively, the logic layer 106 closes threads based on inactivity periods for a given thread. For example, if the inactivity threshold is 10 days, and a thread is idle for 12 days, the logic layer 106 may determine that the thread has been abandoned, but has not been closed based on user agreement and/or statements. In such embodiments, "abandoned" threads may be differentiated in the GUI between other threads that have been closed based on a detected indicator (e.g., a user saying "cheers" in a message in the thread).

Figure 4:
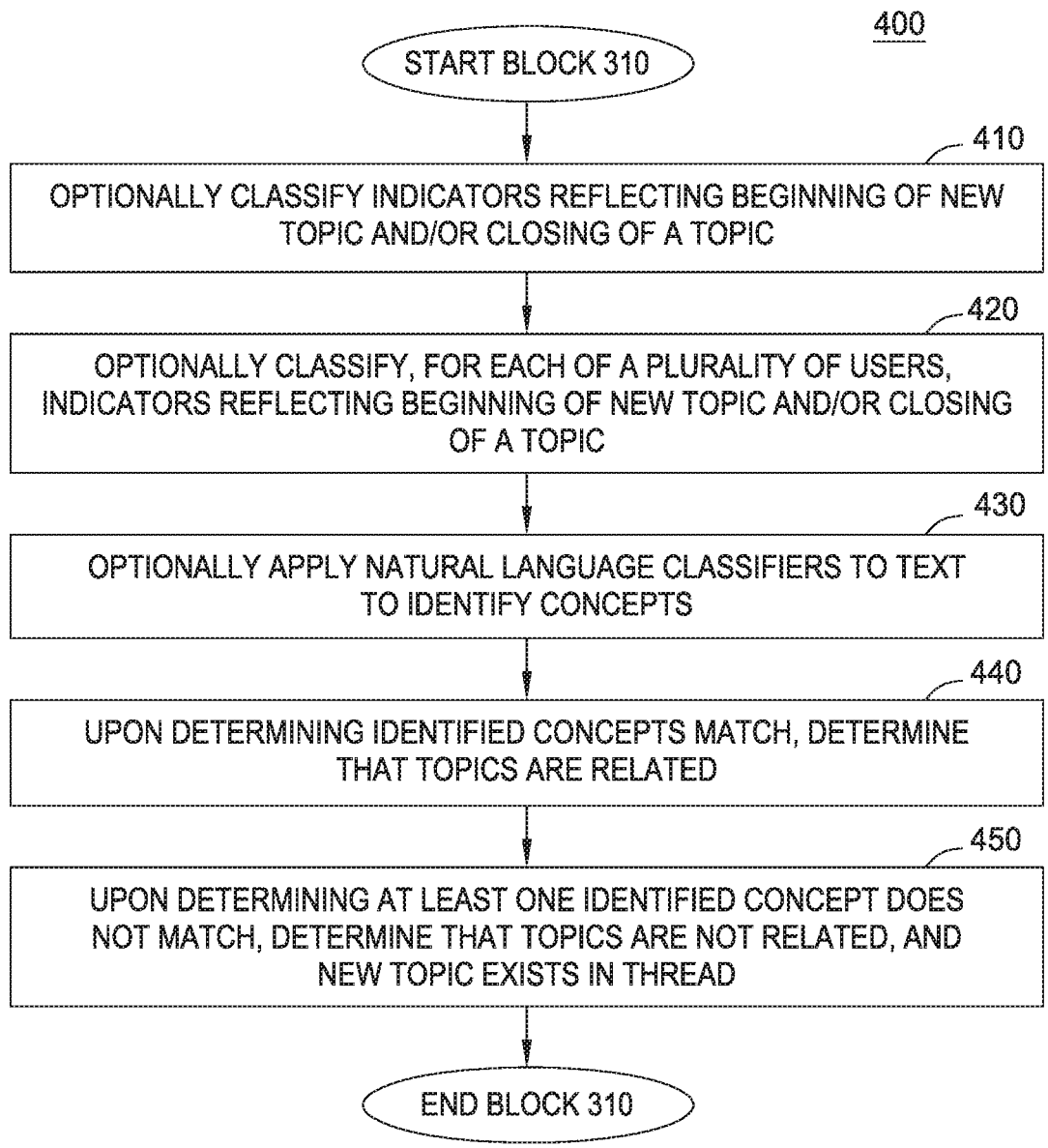
FIG. 4 is a flow chart illustrating an example method to identify indicators of new threads and closed threads, according to one embodiment.

FIG. 4 is a flow chart illustrating an example method 400 corresponding to block 310 to identify indicators of new threads and closed threads, according to one embodiment. As shown, the method 400 begins at block 410, where the logic layer 106 optionally classifies indicators (e.g., words, formatting, and or concepts) which reflect the beginning of a new topic and/or the closing of an existing topic. In at least one embodiment, the logic layer 106 applies a threshold before determining whether the words, formatting, and/or concepts should be classified as reflecting the beginning of a new topic and/or the closing of an existing topic. As another example, the logic layer 106 identifies different tokens (or concepts) in an existing thread. For example, if the logic layer 106 identifies a token (e.g., airplanes) that appears in a thread where users are discussing animals, the logic layer 106 classifies the token (airplanes) as reflecting the beginning of a thread.

At block 420, the logic layer 106 optionally classifies user-specific indicators reflecting the beginning of a new topic and/or closing of a new topic. Often, many users use their own preferred words, phrases, and or punctuation as greetings and/or closings. In such embodiments, the logic layer 106 may associate any such indicators in the respective user profile 110. If the logic layer 106 subsequently identifies a message 104 from a user which includes one of the user-specific indicators, the logic layer 106 determines that a new topic has been started, or an existing topic has been closed, as the case may be. In at least one embodiment, the logic layer 106 prompts the user to confirm whether the indicator should be stored in the user profile. As users confirm or deny storing the indicators in the profiles, the logic layer 106 is trained over time.

At block 430, the logic layer 106 optionally applies natural language classifiers to the text of the messages 104 to identify concepts in the text. At block 440, the logic layer 106, upon determining two or more concepts from two or more messages 104 match, determines that the concepts are related. In such examples, the logic layer 106 would not identify the two or more messages 104 as including a new topic or concept. At block 450, the logic layer 106, determines that a new topic exists in the thread upon determining that at least one concept in the text of a message 104 does not match a concept in a text of a message 104 sharing the same QUID.

Figure 5:
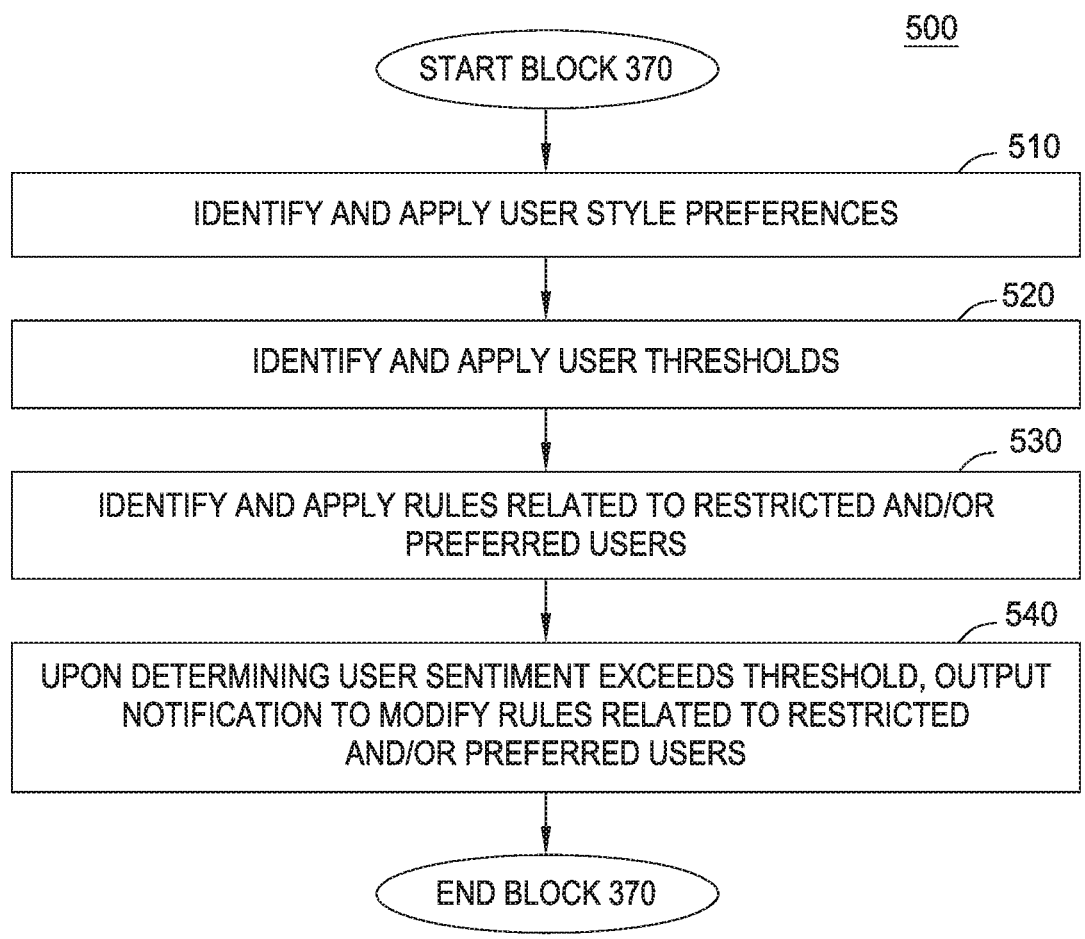
FIG. 5 is a flow chart illustrating an example method to output messages in a second thread as a distinct thread, according to one embodiment.

FIG. 5 is a flow chart illustrating an example method 500 corresponding to block 370 to output messages in a second thread as a distinct thread, according to one embodiment. As shown, the method 500 begins at block 510, where the display layer 109 identifies and applies user style preferences from the user profiles 110. As previously indicated, any user may define any type of style preferences in a respective user profile 110. For example, user A may prefer to view new threads in a bold font in a new browser tab, while user B may prefer to view new threads in an italicized font in the same browser window as the original thread. Therefore, in some embodiments, the display layer 109 renders and outputs the new threads in different ways for different users.

At block 520, the logic layer 106 and/or the display layer 109 identifies and applies any relevant thresholds in the user profiles 110. For example, the thresholds may include maximum and/or minimum numbers of users contributing to a given thread before a new thread is identified in the thread, thread inactivity time thresholds for closing a thread, and the like. At block 530, the logic layer 106 and/or the display layer 109 identifies and applies rules related to restricted and/or preferred users. As previously indicated, users may specify preferences in the user profiles 110 for preferred users and/or restricted (e.g., muted) users. Therefore, the logic layer 106 and/or the display layer 109 ensures that messages submitted by preferred users are prioritized (e.g., displayed in a prominent font/style), while messages submitted by muted users are not outputted for display.

At block 540, the cognitive logic 108 determines that user sentiment for a given user exceeds a threshold. In response, the cognitive logic 108 may output an indication to a different user to modify a rule defined in the user profiles 110. For example, user X may have a setting in their user profile 110 which defines user Y as a restricted user, such that user X does not view user Y's messages in any threads. However, the cognitive logic 108 may monitor feedback from other users related to user Y. For example, the cognitive logic 108 may determine that more than 50% of the posts made by user Y in the last month have an approval rating of 80% or higher (e.g., 80% of other users "like" each post). As such, the cognitive logic 108 determines that user X should consider removing the definition of user Y as a restricted user. If user X approves, the cognitive logic 108 removes the restriction of user Y from user X's user profile 110.

Figure 6:
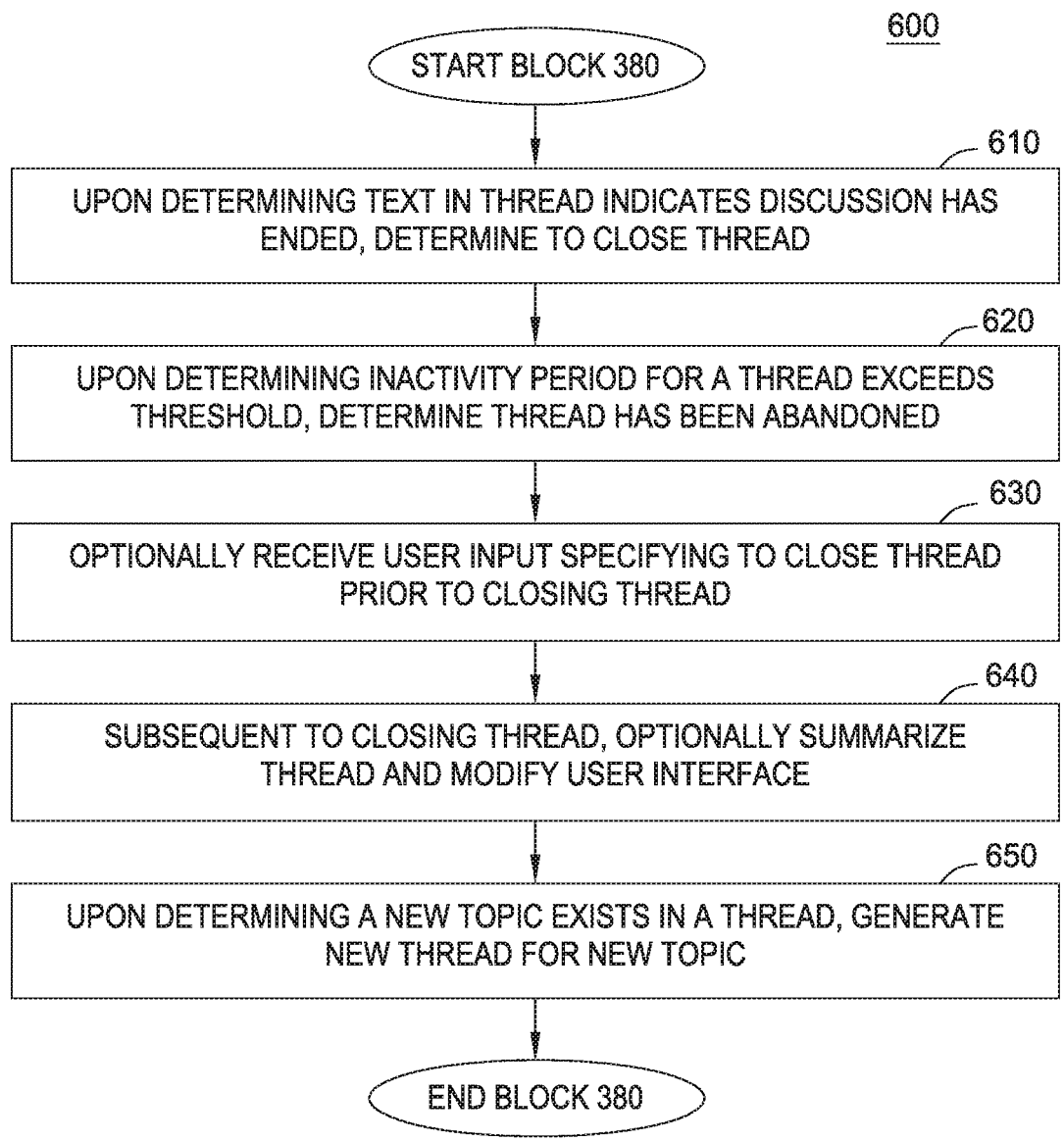
FIG. 6 is a flow chart illustrating an example method to manage threads, according to one embodiment.

FIG. 6 is a flow chart illustrating an example method 600 corresponding to block 380 to manage threads, according to one embodiment. Generally, the management application 105 (or a designated component thereof) monitors the messages 104 to determine when new threads arise in an existing thread and/or existing threads should be closed (e.g., based on inactivity and/or keywords). As shown, the method 600 begins at block 610, where the logic layer 106 closes a thread upon determining that text in one or more messages 104 associated with the thread indicates the discussion has ended. For example, the logic layer 106 may identify keywords and phrases which indicate a discussion has ended, such as "goodbye" and "see you there." In such cases, the logic layer 106 determines that the discussion has ended, and marks the thread as closed.

At block 620, the logic layer 106 determines to mark a thread as abandoned based on a lack of activity in the thread. As previously indicated, the logic layer 106 distinguishes between abandoned threads and threads where consensus is reached to close a topic of conversation. Doing so allows the logic layer 106 to identify users who create threads which then go abandoned, allowing the approval rating of the user to be lowered. For example, if the last message 104 associated with thread X was submitted 11 days prior, the logic layer 106 may identify a 10-day inactivity threshold for abandonment of the thread in the rules 111. As such, the logic layer 106 determines that the inactivity threshold has been exceeded, and determines to mark thread X as abandoned. In at least one embodiment, the logic layer 106 further closes the abandoned thread X. At block 630, the logic layer 106 optionally receives user input specifying to close the threads identified at blocks 610 and/or 620 prior before closing the thread(s).

At block 640, the logic layer 106 optionally summarizes the closed threads and modifies the user interface. For example, the logic layer 106 may extract keywords that reflect the action items and deliverables identified in a work meeting thread, and associate the keywords as metadata describing the thread in the messages 104. Doing so allows users to view a quick summary of a given thread. Furthermore, the display layer 109 may use the summary to output the summary of a given thread in a GUI.

At block 650, the logic layer 106 generates a new thread for a new topic (or concept) upon determining that a new topic exists in an existing thread. As previously indicated, the logic layer 106 continuously monitors the messages 104 to identify topics, concepts, and the like in a given thread. The logic layer 106 compares the identified topics and concepts to determine whether each topic and/or concept matches the other topics and/or concepts in the thread. If at least one topic and/or concept does not match the other topics and/or concepts in the thread, the logic layer 106 determines that a new topic has emerged in the thread, and generates a new thread for the new topic, as described above. Doing so allows the display layer 109 to automatically output the new thread to the users, which may be tailored to the style preferences of each of a plurality of different users.

Figure 7:
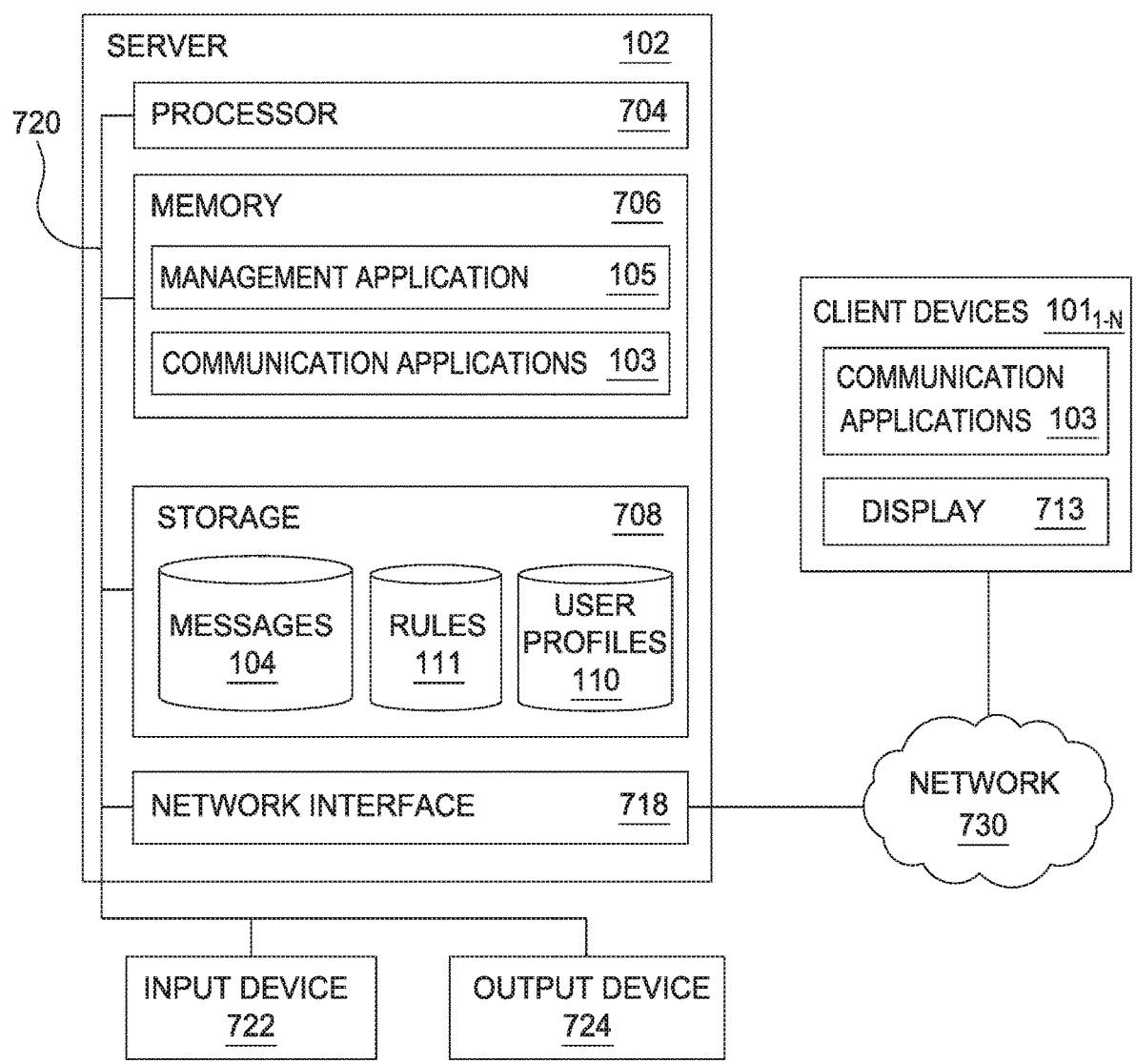
FIG. 7 illustrates an example system which automatically threads conversations based on content and interactions, according to one embodiment.

FIG. 7 illustrates an example system 700 which automatically threads conversation based on content and interactions, according to one embodiment. The networked system 700 includes a computer 702. The computer 702 may also be connected to other computers via a network 730. In general, the network 730 may be a telecommunications network and/or a wide area network (WAN). In a particular embodiment, the network 730 is the Internet.

The computer 702 generally includes a processor 704 which obtains instructions and data via a bus 720 from a memory 706 and/or a storage 708. The computer 702 may also include one or more network interface devices 718, input devices 722, and output devices 724 connected to the bus 720. The computer 702 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 704 is a programmable logic device that performs instruction, logic, and mathematical processing, and may be representative of one or more CPUs. The network interface device 718 may be any type of network communications device allowing the computer 702 to communicate with other computers via the network 730.

The storage 708 is representative of hard-disk drives, solid state drives, flash memory devices, optical media and the like. Generally, the storage 708 stores application programs and data for use by the computer 702. In addition, the memory 706 and the storage 708 may be considered to include memory physically located elsewhere; for example, on another computer coupled to the computer 702 via the bus 720.

The input device 722 may be any device for providing input to the computer 702. For example, a keyboard and/or a mouse may be used. The input device 722 represents a wide variety of input devices, including keyboards, mice, controllers, and so on. Furthermore, the input device 722 may include a set of buttons, switches or other physical device mechanisms for controlling the computer 702. The output device 724 may include output devices such as monitors, touch screen displays, and so on.

As shown, the memory 706 contains the communication applications 102 and the management application 105, while the storage 708 contains the messages 104, user profiles 110, and rules 111. As shown, the client devices 101$_{1-N}$ include the communication applications 103 and a display device 713. The client devices 101$_{1-N}$ further include processors, memory, storage, network interfaces, I/O devices, and a bus (each not pictured).

Advantageously, embodiments disclosed herein provide techniques to automatically identify new threads within existing threads on messaging platforms. Generally, embodiments disclosed herein monitor messages submitted to a given thread, and detect when divergent or different concepts appear in a thread. In response, embodiments disclosed herein automatically generate new threads for the new concepts, and output the new threads for display on a user device.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to embodiments presented in this disclosure. However, the scope of the present disclosure is not limited to specific described embodiments. Instead, any combination of the recited features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

Embodiments of the present disclosure may be a system, a method, and/or a computer program product. The computer program product may include a computer readable storage medium (or media) having computer readable program instructions thereon for causing a processor to carry out aspects disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications or related data available in the cloud. For example, the management application 105 could execute on a computing system in the cloud. In such a case, the management application 105 may store profile data 110 for a plurality of users at a storage location in the cloud. Doing so allows a user to access this information from any computing system attached to a network connected to the cloud (e.g., the Internet).

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
identifying, in a first thread comprising a plurality of messages outputted for display on a display device, a first concept in a text of a first message of the plurality of messages;
identifying a second concept in a text of a second message of the plurality of messages of the first thread using natural language processing to determine a user intention to discuss the second concept;
upon determining that the second concept is different than the first concept, creating a second thread, without user request, comprising a subset of the plurality of messages, wherein each message in the subset of the plurality of message is related to the second concept;
outputting, based on a set of user preferences, the subset of the plurality of messages of the second thread for display on the display device; and
upon identifying a concluding indicator in the subset of the plurality of messages of the second thread:
closing the second thread based on the identification of the concluding indicator,
generating a summary for the second thread, and
outputting the first thread and the summary for the second thread for display on the display device.

2. The method of claim 1, wherein the set of user preferences specify:
(i) a preferred font, (ii) a preferred font style, and (iii) a preferred object for outputting the second thread, wherein the preferred object comprises one of: (i) a new browser window, (ii) a new browser tab, and (iii) a first browser tab, wherein the first thread is outputted in the first browser tab.

3. The method of claim 2, wherein the set of user preferences further specify: (i) a set of preferred users, and (ii) a set of blocked users, wherein each message of the plurality of messages generated by a user in the set of preferred users is outputted for display on the display device, wherein each message in the plurality of messages generated by a user in the set of blocked users is restricted from being outputted for display on the display device.

4. The method of claim 3, wherein the set of user preferences of a first user specifies a second user as a member of the set of blocked users, the method further comprising:
monitoring a plurality of messages generated by the second user;
determining that a count of the plurality of messages generated by the second user receiving positive feedback from a plurality of other users exceeds a threshold;
outputting, to the first user, an indication to remove the second user from the set of blocked users based on the positive feedback; and
responsive to receiving input from the first user specifying to remove the second user from the set of blocked users, updating the user profile of the first user to remove the second user from the set of blocked users.

5. The method of claim 1, wherein plurality of messages of the first thread are associated with a first universally unique identifier (UUID), wherein generating the second thread further comprises associating the subset of the plurality of messages of the second thread with a second UUID, different than the first UUID.

6. The method of claim 1, further comprising:
closing the second thread upon determining that a consensus has been reached among users to end the second thread.

7. A computer program product, comprising:
a computer-readable storage medium having computer readable program code embodied therewith, the computer readable program code executable by a processor to perform an operation comprising:
identifying, in a first thread comprising a plurality of messages outputted for display on a display device, a first concept in a text of a first message of the plurality of messages;
identifying a second concept in a text of a second message of the plurality of messages of the first thread using natural language processing to determine a user intention to discuss the second concept;
upon determining that the second concept is different than the first concept, creating a second thread, without user request, comprising a subset of the plurality of messages, wherein each message in the subset of the plurality of message is related to the second concept;
outputting, based on a set of user preferences, the subset of the plurality of messages of the second thread for display on the display device; and
upon identifying a concluding indicator in the subset of the plurality of messages of the second thread:
closing the second thread based on the identification of the concluding indicator,
generating a summary for the second thread, and
outputting the first thread and the summary for the second thread for display on the display device.

8. The computer program product of claim 7, wherein the set of user preferences specify: (i) a preferred font, (ii) a preferred font style, and (iii) a preferred object for outputting the second thread, wherein the preferred object comprises one of: (i) a new browser window, (ii) a new browser tab, and (iii) a first browser tab, wherein the first thread is outputted in the first browser tab.

9. The computer program product of claim 8, wherein the set of user preferences further specify: (i) a set of preferred users, and (ii) a set of blocked users, wherein each message of the plurality of messages generated by a user in the set of preferred users is outputted for display on the display device, wherein each message in the plurality of messages generated by a user in the set of blocked users is restricted from being outputted for display on the display device.

10. The computer program product of claim 9, wherein the set of user preferences of a first user specifies a second user as a member of the set of blocked users, the operation further comprising:

monitoring a plurality of messages generated by the second user;

determining that a count of the plurality of messages generated by the second user receiving positive feedback from a plurality of other users exceeds a threshold;

outputting, to the first user, an indication to remove the second user from the set of blocked users based on the positive feedback; and responsive to receiving input from the first user specifying to remove the second user from the set of blocked users, updating the user profile of the first user to remove the second user from the set of blocked users.

11. The computer program product of claim 7, the operation further comprising:

analyzing a text of each of a plurality of messages of a plurality of threads;

classifying, based on the analysis, a first set of terms as indicating formation of a new thread; and classifying, based on the analysis, a second set of terms as indicating closing of an existing thread.

12. The computer program product of claim 7, wherein plurality of messages of the first thread are associated with a first universally unique identifier (UUID), wherein generating the second thread further comprises associating the subset of the plurality of messages of the second thread with a second UUID, different than the first UUID.

13. A system, comprising:

a processor; and a memory storing one or more instructions which, when executed by the processor, performs an operation comprising:

identifying, in a first thread comprising a plurality of messages outputted for display on a display device, a first concept in a text of a first message of the plurality of messages;

identifying a second concept in a text of a second message of the plurality of messages of the first thread using natural language processing to determine a user intention to discuss the second concept;

upon determining that the second concept is different than the first concept, creating a second thread, without user request, comprising a subset of the plurality of messages, wherein each message in the subset of the plurality of message is related to the second concept;

outputting, based on a set of user preferences, the subset of the plurality of messages of the second thread for display on the display device; and upon identifying a concluding indicator in the subset of the plurality of messages of the second thread:

closing the second thread based on the identification of the concluding indicator, generating a summary for the second thread, and outputting the first thread and the summary for the second thread for display on the display device.

14. The system of claim 13, wherein the set of user preferences specify: (i) a preferred font, (ii) a preferred font style, and (iii) a preferred object for outputting the second thread, wherein the preferred object comprises one of: (i) a new browser window, (ii) a new browser tab, and (iii) a first browser tab, wherein the first thread is outputted in the first browser tab.

15. The system of claim 14, wherein the set of user preferences further specify: (i) a set of preferred users, and (ii) a set of blocked users, wherein each message of the plurality of messages generated by a user in the set of preferred users is outputted for display on the display device, wherein each message in the plurality of messages generated by a user in the set of blocked users is restricted from being outputted for display on the display device.

16. The system of claim 15, wherein plurality of messages of the first thread are associated with a first universally unique identifier (UUID), wherein generating the second thread further comprises associating the subset of the plurality of messages of the second thread with a second UUID, different than the first UUID, wherein the set of user preferences of a first user specifies a second user as a member of the set of blocked users, the operation further comprising:

monitoring a plurality of messages generated by the second user;

determining that a count of the plurality of messages generated by the second user receiving positive feedback from a plurality of other users exceeds a threshold;

outputting, to the first user, an indication to remove the second user from the set of blocked users based on the positive feedback; and responsive to receiving input from the first user specifying to remove the second user from the set of blocked users, updating the user profile of the first user to remove the second user from the set of blocked users.

17. The system of claim 13, the operation further comprising:

analyzing a text of each of a plurality of messages of a plurality of threads;

classifying, based on the analysis, a first set of terms as indicating formation of a new thread; and classifying, based on the analysis, a second set of terms as indicating closing of an existing thread.

* * * * *